US007945912B1

(12) United States Patent
Nussbaum et al.

(10) Patent No.: US 7,945,912 B1
(45) Date of Patent: May 17, 2011

(54) HIERARCHICAL QUEUE-BASED LOCKS

(75) Inventors: Daniel S. Nussbaum, Cambridge, MA (US); Nir N. Shavit, Cambridge, MA (US); Victor M. Luchangco, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 1384 days.

(21) Appl. No.: 11/445,962

(22) Filed: Jun. 2, 2006

(51) Int. Cl.
*G06F 9/46* (2006.01)
(52) U.S. Cl. .................................................. 718/104
(58) Field of Classification Search .................. 718/107, 718/104
See application file for complete search history.

(56) References Cited

U.S. PATENT DOCUMENTS

| 5,991,845 A * | 11/1999 | Bohannon et al. | 710/200 |
| 2003/0041173 A1* | 2/2003 | Hoyle | 709/248 |
| 2003/0200457 A1* | 10/2003 | Auslander et al. | 713/200 |

OTHER PUBLICATIONS

Sun Fire™ E25K/E20K Systems, Overview Manual, Sun Microsystems, Inc., Jul. 2005, Revision A, 72 pages.
Kongetira, Poonacha, Aingaran, Kathirgamar, Olukotun, Kunle, Niagara: A 32-Way Multithreaded Sparc Processor, Published by the IEEE Computer Society, 2005, 9 pages.
Scott, Michael L. and Scherer III, William N., "Scalable Queue-Based Spin Locks with Timeout", Department of Computer Science, University of Rochester, ACM, Jun. 2001, 9 pages.
Magnusson, Peter, Landin, Anders, Hagersten, Erik, "Queue Locks on Cache Coherent Multiprocessors", IEEE, 1994, 6 pages.
Craig, Travis S., Building FIFO and Priority-Queuing Spin Locks from Atomic Swap, Department of Computer Science and Engineering, University of Washington, Feb. 1, 1993, 29 pages.
Mellor-Crummey, John M. and Scott, Michael L., "Algorithms for Scalable Synchronization on Shared-memory Multiprocessors", ACM Transactions on Computer Systems, vol. 9, No. 1, Feb. 1991, 45 pages.
Anderson, Thomas E., "The Performance of Spin Lock Alternatives for Shared-Memory Multiprocessors", IEEE Transactions on Parallel and Distributed Systems, vol. 1, No. 1, Jan. 1990, 11 pages.
Agarwal, Anant and Cherian, Mathews, "Adaptive Backoff Synchronization Techniques", ACM, 1989, 11 pages.
Radovic, Zoran and Hagersten, Erik, "Hierarchical Backoff Locks for Nonuniform Communication Architectures", Department of Information Technology, Uppsala University., 12 pages. Feb. 2003.

* cited by examiner

*Primary Examiner* — Meng-Ai An
*Assistant Examiner* — Blake Kumabe
(74) *Attorney, Agent, or Firm* — Osha • Liang LLP (57) ABSTRACT

In general, in one aspect, the invention relates to a method of establishing a queue-based lock including inserting a first qnode into a local queue, where the first qnode is associated with a first thread, splicing the local queue into the global queue, obtaining a lock for the first thread when the first qnode is at the head of the global queue, and executing a critical section of the first thread after obtaining the lock.

19 Claims, 6 Drawing Sheets

HIERARCHICAL QUEUE-BASED LOCKS

BACKGROUND

In computer system design and programming, a "thread" or "thread of execution" is a sequence of instructions being executed by a processor. In many computer systems, multiple threads can be executed in parallel. This "multithreading" may be supported by a single processor that switches between different threads, or by multiple processors each processing one or more threads.

In a multithreaded system, mechanisms may be required to handle situations in which multiple threads attempt to concurrently access a particular shared resource (e.g., a shared memory location). Such mechanisms often involve the use of "locks" which temporarily prevent the shared resource from being accessed by more than one thread. The single thread permitted to access the shared resource is said to have "acquired" or "obtained" the lock. A thread wishing to access the shared resource must first acquire or obtain the lock. When the thread is finished using the shared resource, the thread may "release" the lock so that the shared resource may become available to another thread.

SUMMARY

In general, in one aspect, the invention relates to a method of establishing a queue-based lock including inserting a first qnode into a local queue, where the first qnode is associated with a first thread, splicing the local queue into the global queue, obtaining a lock for the first thread when the first qnode is at the head of the global queue, and executing a critical section of the first thread after obtaining the lock.

In general, in one aspect, the invention relates to a system for establishing a queue-based lock including a plurality of clusters, a plurality of local queues, where each of the plurality of local queues is associated with at least one of the plurality of clusters, a global queue configured to accept a qnode from at least one of the plurality of local queues and obtain a lock for the qnode when it reaches the head of the global queue.

In general, in one aspect, the invention relates to a computer readable medium storing instructions for establishing a queue-based lock, the instructions including functionality to insert a first qnode into a local queue, where the first qnode is associated with a first thread, to splice the local queue into the global queue, to obtain a lock for the first thread when the first qnode is at the head of the global queue, and to execute a critical section of the first thread after obtaining the lock.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to establish a queue-based lock using a global queue and one or more local queues. In general, embodiments of the invention provide a method and apparatus to establish a queue-based lock using qnodes (discussed below) associated with threads.

Figure 1:
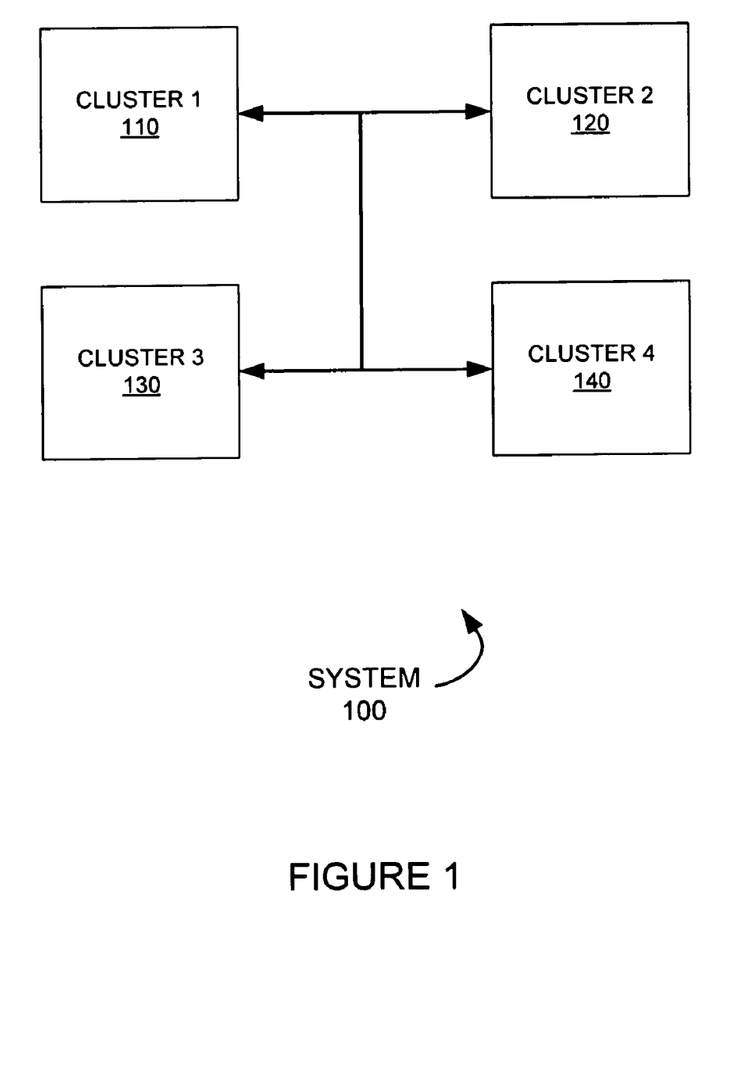
FIG. 1 shows a system in accordance with one or more embodiments of the invention.

FIG. 1 shows a system (System (100)) in accordance with one or more embodiments of the invention. As shown in FIG. 1, System (100) includes one or more clusters (Cluster 1 (110), Cluster 2 (120), Cluster 3 (130), Cluster 4 (140)). The clusters may all be located on the same device (e.g., a server, mainframe, desktop PC, laptop, mobile phone, PDA, etc.) or may be located on separate devices connected by a network (e.g., the Internet), with wired and/or wireless segments. System (100) may include a global queue (not shown) while each cluster (Cluster 1 (110), Cluster 2 (120), Cluster 3 (130), Cluster 4 (140)) may include a local queue (discussed below). Each cluster may also contain one or more caches, a memory, and one or more processors (not shown). The one or more caches and memory of a cluster are shared among (i.e., accessible by) the one or more processors local to that cluster. A cluster's memory may also be accessible to processors belonging to different clusters. In one or more embodiments of the invention, access by a processor to local memory (i.e., memory in the same cluster as the processor) may be faster than access by the processor to remote memory (i.e., memory in a cluster different from the cluster containing the processor).

In one or more embodiments of the invention, System (100) is capable of processing multiple threads. As mentioned above, a "thread" or "thread of execution" is a sequence of instructions to be executed by a processor (e.g., a processor in one of the clusters). Some of the instructions belonging to a thread may access resources that are concurrently available to other threads (e.g., memory in one or more of the clusters). Such a resource may be referred to as a "shared resource." Those skilled in the art will appreciate that it may be necessary to prevent a shared resource from being accessed by more than one thread at a given time. In other words, it may be necessary for a thread to temporarily have sole access to a shared resource.

In one or more embodiments of the invention, the instructions of a thread that require temporary sole access to a shared resource may be referred to as a "critical section" of the thread. A thread may acquire a "lock" prior to executing the critical section to ensure the thread has sole access to the shared resource. The processor executing the thread must wait until the lock has been acquired before attempting to execute the critical section. During this waiting period, the thread may be referred to as "spinning." Those skilled in the art will appreciate that a spinning thread in this sense may be a thread that is "active" while waiting, or a thread that is placed into "sleep" mode until the waiting period is over. Following execution of the critical section, the lock may be released and become available to another thread.

Figure 2:
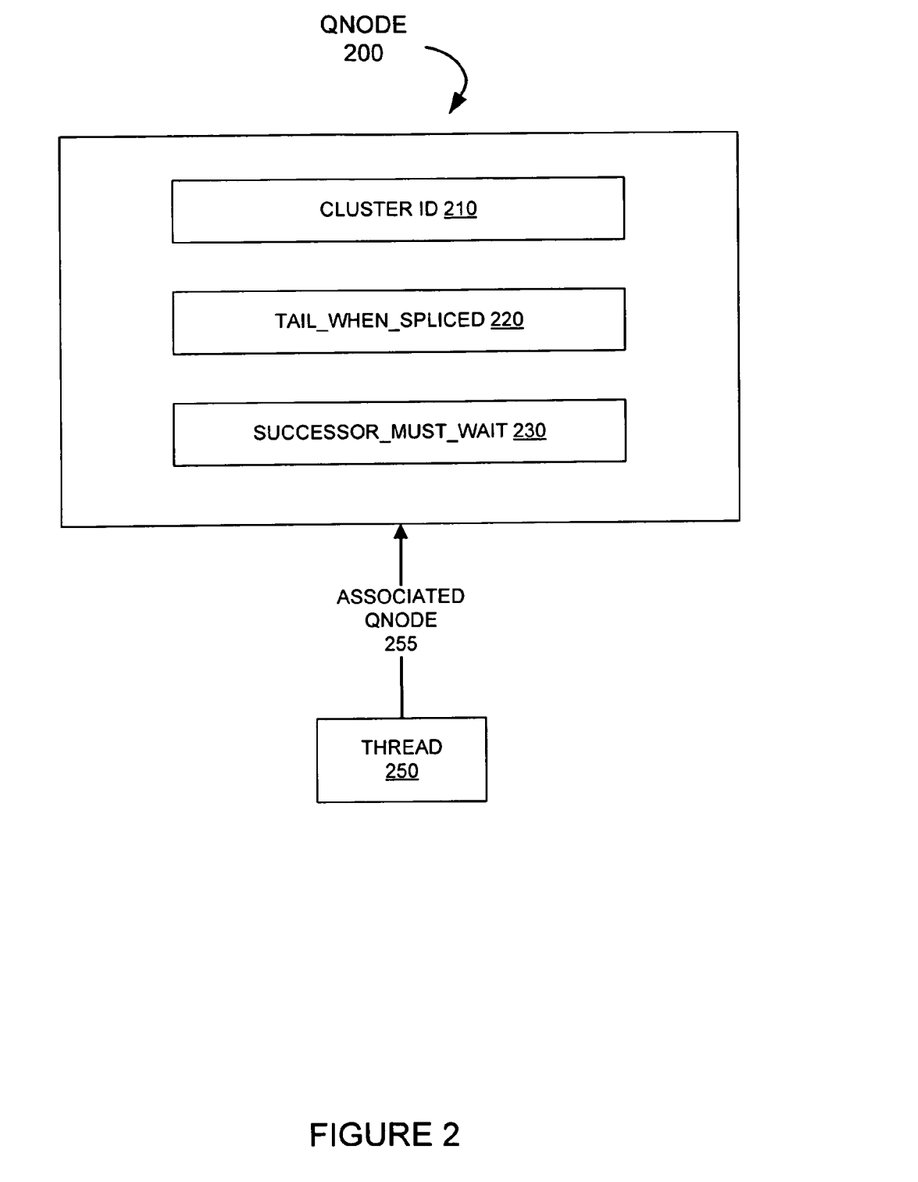
FIG. 2 shows a qnode and thread in accordance with one or more embodiments of the invention.

In one or more embodiments of the invention, each thread requiring a lock may be represented by a "qnode." A thread may have a pointer variable pointing to the associated qnode. FIG. 2 shows a qnode in accordance with one or more embodiments of the invention. As shown in FIG. 2, a qnode (QNode (200)) is associated with a thread (Thread (250)). Accordingly, Thread (250) has a pointer variable (Associated QNode (255)) pointing to QNode (200). QNode (200) may include an identification field (Cluster ID (210)), and two flags (Tail_When_Spliced (220), Successor_Must_Wait (230)). Cluster ID (210) may identify the cluster containing the processor that is executing or attempting to execute the thread. Tail_When_Spliced (220) and Successor_Must_Wait (230) may be Boolean fields used while QNode (200) is enqueued (discussed below). In one or more embodiments of the invention, the identification field (Cluster ID (210)) and the two flags (Tail_When_Spliced (220), Successor_Must_Wait (230)) may be implemented as a single word.

Figure 3:
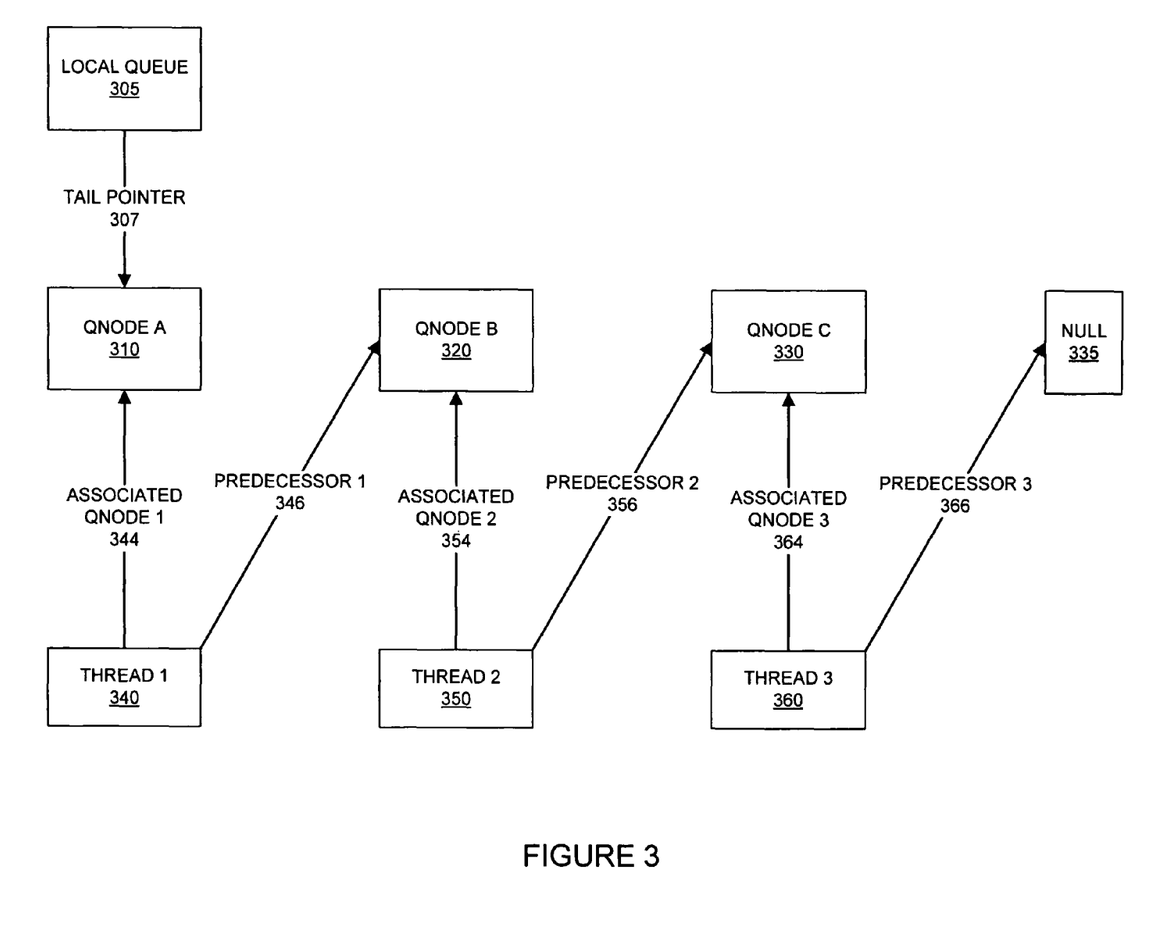
FIG. 3 shows a local queue in accordance with one or more embodiments of the invention.

As discussed above, in one or more embodiments of the invention, each cluster includes a local queue. FIG. 3 shows a local queue in accordance with one or more embodiments of the present invention. As shown in FIG. 3, a local queue (Local Queue (305)) includes zero or more qnodes (QNode A (310), QNode B (320), QNode C (330)). Each of the qnodes is associated with a thread in the cluster wishing to acquire a lock. Those skilled in the art will appreciate QNode C (330) is at the head of Local Queue (305) while QNode A (310) is at the tail of Local Queue (305). When a qnode is the head of a local queue (e.g., QNode C (330) in FIG. 3), the thread associated with the head qnode may be referred to as a cluster master (discussed below). Those skilled in the art will also appreciate that Local Queue (305) may be referenced by a pointer variable (Tail Pointer (307)) pointing to the tail of Local Queue (305) (QNode A (310)). Those skilled in the art will further appreciate a queue (e.g., Local Queue (305)) has a first-in-first-out (FIFO) order.

As discussed above in reference to FIG. 2, a thread may have a pointer variable pointing to the associated qnode. Still referring to FIG. 3, Thread 1 (340) is associated with QNode A (310). Accordingly, Thread 1 (340) has a pointer variable (Associated QNode 1 (344)) pointing to QNode A (310). In a similar fashion, Thread 2 (350) is associated with QNode B (320). Accordingly, Thread 2 (350) has a pointer variable (Associated QNode 2 (354)) pointing to QNode B (320)). Further still, Thread 3 (360) is associated with QNode C (330). Accordingly, Thread 3 (360) has a pointer variable (Associated QNode 3 (364)) pointing to QNode C (330).

In one or more embodiments of the invention, each includes a second pointer variable. Once a qnode has been inserted into a local queue, the second pointer variable of the thread associated with the qnode points to the qnode's predecessor. For example, still referring to FIG. 3, QNode C (330) is the predecessor of QNode B (320). Accordingly, the second pointer variable (Predecessor 2 (356)) of Thread 2 (350) points to QNode C (330). In a similar fashion, QNode B (320) is the predecessor of QNode A (310). Accordingly, the second pointer variable (Predecessor 1 (346)) of Thread 1 (340) points to QNode B (320). Those skilled in the art will appreciate that such embodiments may be regarded as implementing the local queue as an implicit linked list. Those skilled in the art will also appreciate that the second variable (Predecessor 3 (366)) of the thread associated with the head qnode may point to Null (335). In one or more embodiments of the invention, the second variable (Predecessor 3 (366)) of the thread associated with the head qnode may point to a qnode in another queue (e.g., a global queue, discussed below).

Figure 4:
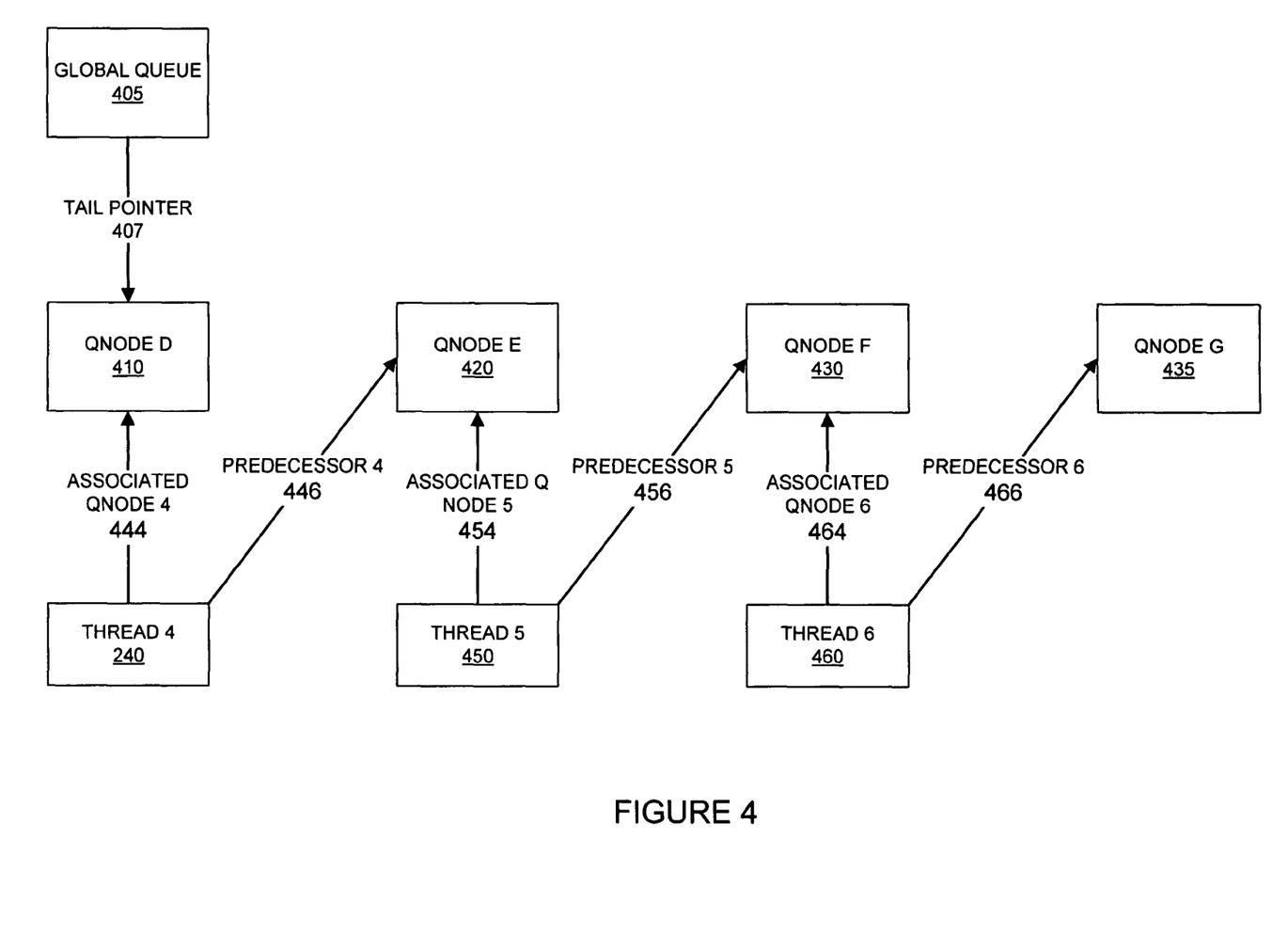
FIG. 4 shows a global queue in accordance with one or more embodiments of the invention.

As discussed above, in one or more embodiments of the invention, System (100) shown in FIG. 1 includes a global queue (not shown). FIG. 4 shows a global queue in accordance with one or more embodiments of the invention. As shown in FIG. 4, a global queue (Global Queue (405)) includes one or more qnodes (QNode D (410), QNode E (420), QNode F (430), QNode G (435)). Each of the qnodes is associated with a thread requiring a lock. The threads may originate (i.e., belong) to the same or different clusters. Those skilled in the art will appreciate that QNode D (410) is at the tail of Global Queue (405). Those skilled in the art will further appreciate that Global Queue (405) may be referenced by a pointer variable (Tail Pointer (407)) pointing to the tail of Global Queue (405) (QNode D (410)).

As discussed above in reference to FIG. 2, a thread may have a pointer variable pointing to the associated qnode. Still referring to FIG. 4, Thread 4 (440) is associated with QNode D (410). Accordingly, Thread 4 (440) has a pointer variable (Associated QNode 4 (444)) pointing to QNode D (410). In a similar fashion, Thread 5 (450) is associated with QNode E (420). Accordingly, Thread 5 (450) has a pointer variable (Associated QNode 5 (454)) pointing to QNode E (420)). Further still, Thread 6 (460) is associated with QNode F (430). Accordingly, Thread 3 (360) has a pointer variable (Associated QNode 6 (464)) pointing to QNode F (430).

Still referring to FIG. 4, QNode G (435) is predecessor to QNode F (430). Accordingly, the second pointer variable (Predecessor 6 (466)) of Thread 6 (460) points to QNode G (435). QNode F (430) is predecessor of QNode E (420). Accordingly, the second pointer variable (Predecessor 5 (456)) of Thread 5 (450) points to QNode F (430). In a similar fashion, QNode E (420) is a predecessor of QNode D (410). Accordingly, the second pointer variable (Predecessor 4 (446)) of Thread 4 (440) points to QNode E (420). Those skilled in the art will appreciate that such embodiments may be regarded as implementing the global queue as an implicit linked list. Those skilled in the art will also appreciate that QNode G (435) is not associated with a thread. In one or more embodiments of the invention, QNode G (435) is used for qnode recycling (discussed below). In one or more embodiments of the invention, QNode F (430) is considered to be the head of Global Queue (405) because it is the first qnode in Global Queue (405) associated with a thread.

Figure 5:
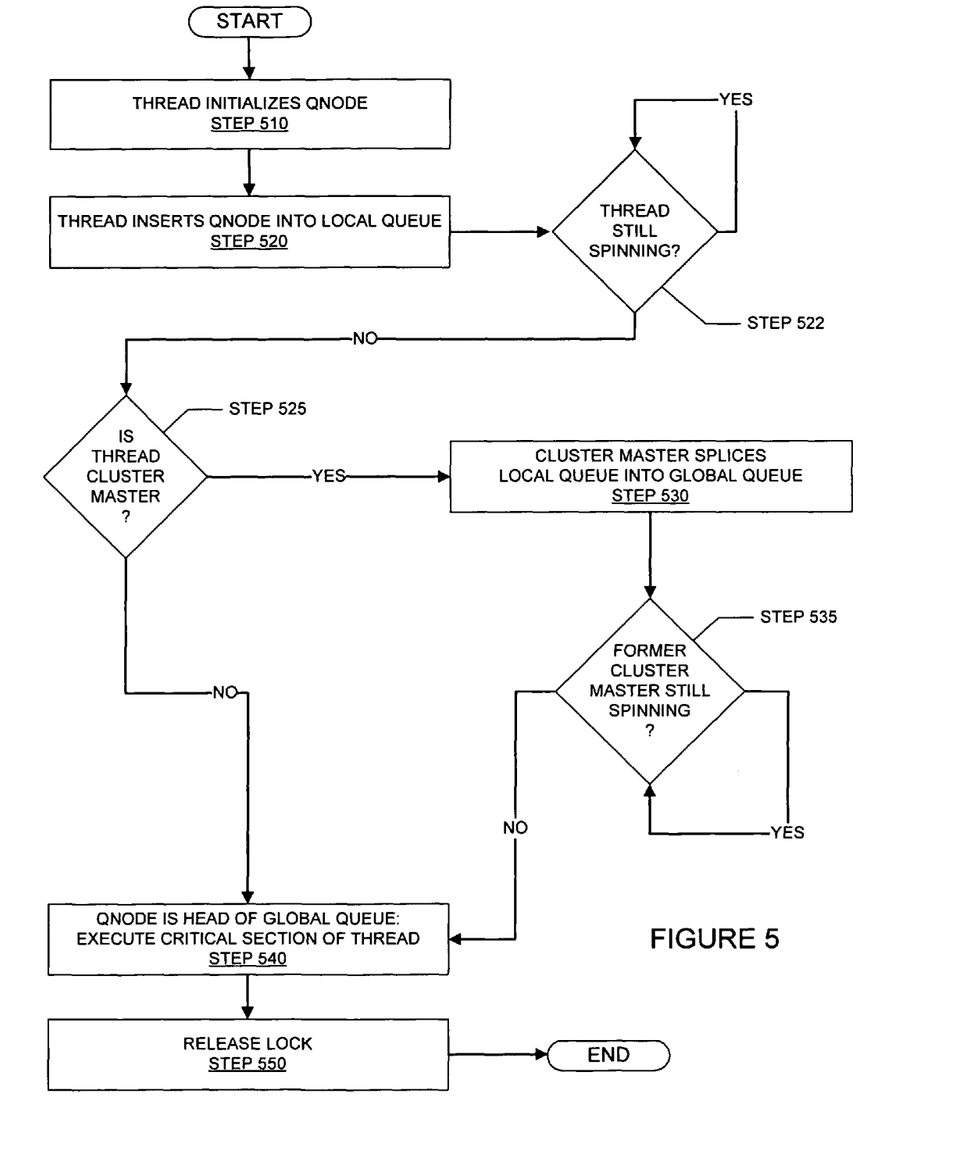
FIG. 5 shows a flowchart for establishing a queue-based lock in accordance with one or more embodiments of the invention.

FIG. 5 is a flowchart for establishing a hierarchical queue-based lock in accordance with one or more embodiments of the invention. In STEP 510, a thread requiring a lock initializes its associated qnode. In STEP 520, the thread inserts the initialized qnode into the local queue. In STEP 522, a determination is made whether the thread is still spinning. In STEP 525, a determination is made whether the thread associated with the qnode in the local queue is the cluster master. In STEP 530, the local queue is spliced into the global queue by the cluster master and the cluster master is placed back in the spinning mode. In STEP 535, a determination is made whether the former cluster master is still spinning. In STEP 540, the qnode is head of the global queue. The associated thread has acquired the lock and executes the critical section. In STEP 550, the lock is released and the qnode is recycled. Each step is discussed in detail below.

Initially, a thread requiring a lock initializes its associated qnode (STEP 510). In one or more embodiments of the invention, the initialization process may include setting the qnode's successor_must_wait flag equal to "true," setting the qnode's tail_when_spliced flag equal to "false," and setting the qnode's identifier field (i.e., Cluster ID (210) in FIG. 2) appropriately.

In STEP 520, the thread may insert the initialized qnode into the local queue (i.e., enqueue). In one or more embodiments of the invention, the process of inserting the qnode may be implemented using a compare-and-swap (CAS) operation. In one or more embodiments of the invention, the CAS operation changes the local queue's pointer variable (e.g., Tail Pointer (307) in FIG. 3) to now point to the qnode to be inserted. Upon success of the CAS operation, the thread sets its second pointer variable to point to the qnode's predecessor in the local queue. When a qnode is enqueued, the associated thread is waiting to acquire a lock. Accordingly, the thread may be referred to as "spinning." In one or more embodiments of the invention, thread spinning occurs mainly in the cache of the cluster containing the thread.

In STEP 522, a determination is made whether the thread has stopped spinning. In one or more embodiments of the invention, the thread of a qnode enqueued in the local queue (or global queue as discussed below) continues to spin until at least one of the three following conditions is satisfied:

(i) the qnode's predecessor has its tail_when_spliced flag set equal to "true";

(ii) the qnode's predecessor is not from the same cluster; or (iii) the qnode's predecessor is from the same cluster, the qnode's predecessor has its tail_when_spliced flag set equal to "false", and the qnode's predecessor has its successor_must_wait flag set equal to "false".

Those skilled in the art will appreciate that any of the three conditions discussed above may be determined by examining the two flags and/or identification field of the qnode and its predecessor. If the thread is no longer spinning, then the process proceeds to STEP 525.

In STEP 525, a determination is made whether the thread has stopped spinning because it is the cluster master. The thread associated with the qnode at the head of the local queue (e.g., QNode C (330) in FIG. 3) may be referred to as the cluster master. In one or more embodiment of the invention, the thread may be identified as the cluster master if condition (i) or (ii) of STEP 522 is true. If a qnode is inserted into an empty local queue (i.e., its predecessor is NULL), then the thread associated with the qnode may immediately become the cluster master. If the thread associated with the qnode is identified as the cluster master, then the process continues to STEP 530. If condition (iii) of STEP 522 is true (i.e., the thread associated with the qnode is not identified as the cluster master), then the process proceeds to STEP 540.

In STEP 530, the local queue is spliced into the global queue. In one or more embodiments of the invention, the cluster master may initiate the splicing. In one or more embodiments of the invention, the cluster master may wait a specified amount of time before attempting to splice the local queue into the global queue. The specified amount of time may be referred to as a combining delay. In one or more embodiments of the invention, the combining delay may be increased or decreased using a "backoff" scheme which is well known in the art.

In one or more embodiments of the invention, splicing the local queue into the global queue may be implemented using a CAS operation. A CAS operation splicing a local queue into the global queue may be referred to as a non-local CAS operation. The non-local CAS operation may change the global queue's pointer variable (e.g., Tail Pointer (407) in FIG. 4) to point to the tail qnode of the local queue, and setting the second pointer variable of the cluster master to point to the tail qnode of the global queue. In one or more embodiments of the inventions, after splicing the local queue with the global queue, the tail_when_spliced flag of the new tail qnode of the global queue is set to "true". Those skilled in the art will appreciate that the splicing process preserves the FIFO order of the qnodes from the local queue. In other words, the spliced qnodes are in the same order in the global queue as they were in the local queue. In one or more embodiments of the invention, once the qnode associated with the cluster master has been spliced into the global queue, it is placed back in spinning mode.

Those skilled in the art will appreciate that if additional qnodes are inserted into the local queue after the splicing has been initiated, the first of the newly added qnodes will continue to spin until the tail_when_spliced flag of its predecessor (now spliced into the global queue) is set to "true". Those skilled in the art will also appreciate that once the qnode associated with the cluster master has been spliced into the global queue, the cluster master is placed back in spinning mode.

In STEP 535, a determination is made whether the former cluster master is still spinning. In one or more embodiments of the invention, the cluster master may no longer spin if the qnode associated with the cluster master is now head of the global queue. In one or more embodiments of the invention, a qnode is head of the global queue if its predecessor (in the global queue) has its successor_must_wait flag set to "false". If the qnode is identified as being head of the global queue, then the process proceeds to STEP 540. Otherwise, the process waits until the qnode associated with cluster master becomes the head of the global queue.

In STEP 540, the qnode is head of the global queue. The qnode may be associated with a former cluster master (STEPS 525, 530, 535) or may be associated with a thread that was not a cluster master (i.e., condition (iii) of STEP 522). In one or more embodiments of the invention, when the qnode is the head of the global queue, the thread associated with the qnode is deemed to have acquired the lock, and may execute its critical section.

In one or more embodiments of the invention, following execution of a thread's critical section, the qnode associated with the thread sets its flag successor_must_wait to "false" to release the lock, and the thread changes its pointer variable currently pointing to the associated qnode, to now point to the associated qnode's predecessor (STEP 550). For example, referring back to FIG. 4, QNode F (430) is head of the global queue. Accordingly, Thread 6 (460) has acquired the lock. When Thread 6 (460) finishes executing its critical section, QNode F's (430) flag successor_must_wait will be set to "false", and Thread 6 (460) will set its pointer variable (Associated QNode 6 (464)) to point to QNode G (435). This may be considered qnode recycling.

Advantages of one or more embodiments of the invention may include: allowing threads with high memory locality to acquire the lock consecutively, thus reducing the overall level of cache misses when executing instructions in the critical section; providing a fair chance for all threads to acquire the lock; minimizing cost by using a minimal number of non-local CAS operations; and minimizing the amount of memory required to acquire locks by using a recycling scheme.

Figure 6:
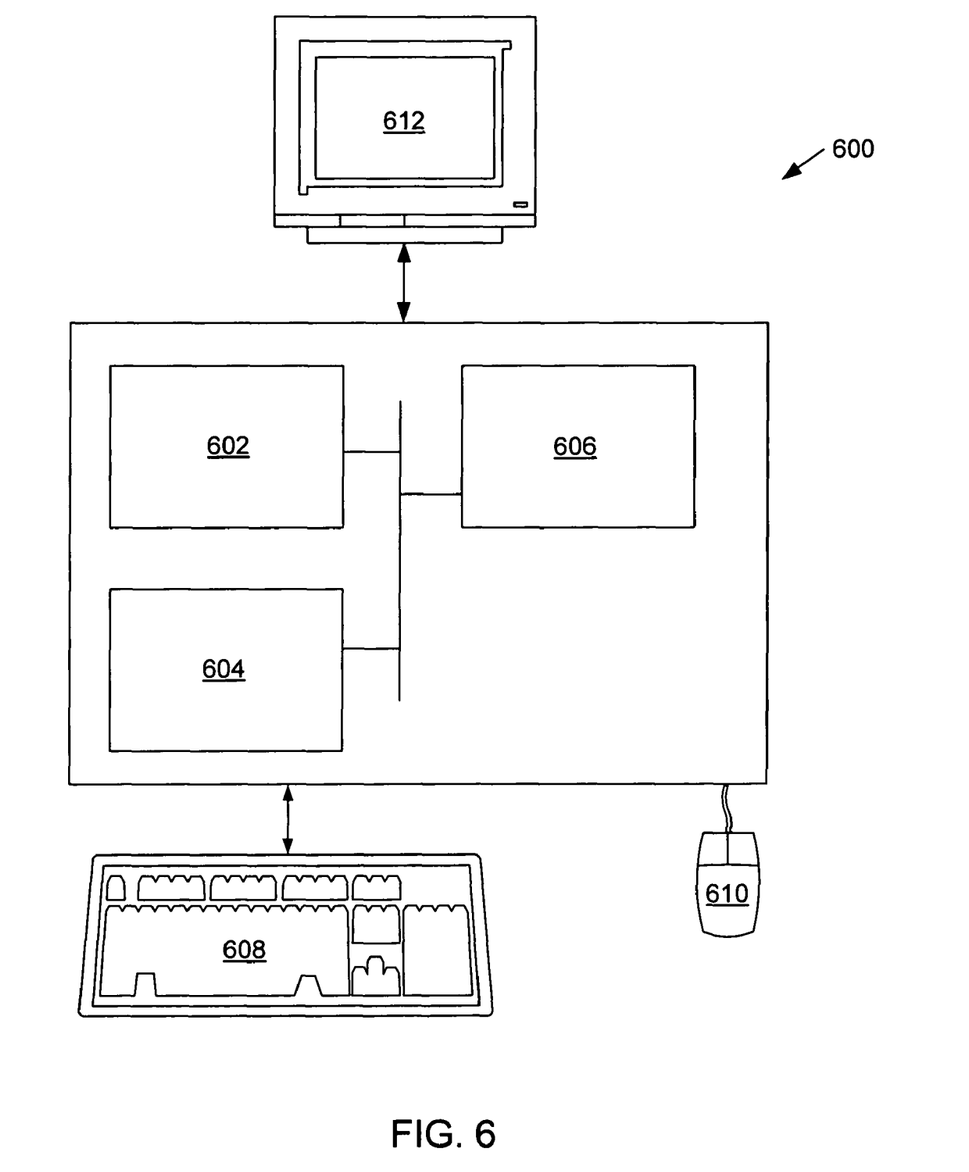
FIG. 6 shows a typical computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., cluster, local queue, global queue) may be located on a different node within the distributed system. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of managing queue-based locks, comprising:
obtaining, within a first cluster of a system, a first thread comprising a critical section requiring a lock to access a shared resource of the system;
initializing, by the first thread executing on a processor in the first cluster, a first qnode representing the first thread in response to the critical section requiring the lock, wherein the first qnode is a data structure referenced by a first pointer of the first thread;
inserting, by the first thread and in response to the critical section requiring the lock, the first qnode into a local queue of the first cluster by setting a tail pointer of the local queue to reference the first qnode, wherein the first thread comprises a second pointer referencing a predecessor qnode of the first qnode;
determining, by the first thread and based on a first qnode in the predecessor qnode, the first qnode is at a head of the local queue;
splicing, by the first thread and in response to the first field being at the head of the local queue, the local queue into a global queue of the system for the shared resource, wherein splicing the local queue into the global queue comprises setting a tail pointer of the global queue to reference a tail qnode in the local queue;
determining, by the first thread and based on a second field in the predecessor qnode, the first qnode is at a head of the global qnode;
obtaining, by the first thread and in response to the first qnode being at the head of the global queue, the lock for the shared resource; and
executing the critical section of the first thread after obtaining the lock.

2. The method of claim 1, wherein setting the tail pointer of the local queue to reference the first qnode comprises using a compare-and-swap (CAS) operation.

3. The method of claim 1, further comprising:
initiating a combination delay after determining the first qnode is at the head of the local queue,
wherein splicing the local queue into the global queue occurs following the combining delay.

4. The method of claim 1, further comprising:
setting, after executing the critical section of the first thread, the first pointer of the first thread to reference the predecessor qnode.

5. The method of claim 1, further comprising:
inserting a second qnode into the local queue after inserting the first qnode into the local queue,
wherein the second qnode is a data structure representing a second thread,
wherein the first qnode and the second qnode corresponds to a first-in-first-out (FIFO) order in the local queue, and
wherein the FIFO order of the first qnode and the second qnode is preserved after splicing the local queue and the global queue.

6. The method of claim 5, further comprising:
releasing the lock following the execution of the critical section of the first thread by setting a field in the first qnode;
determining, by the second thread and based on the field in the first qnode, the second qnode is at the head of the global qnode;
obtaining, by the second thread and in response to the second qnode being at the head of the global queue, the lock for the shared resource; and
executing a critical section of the second thread after obtaining the lock.

7. The method of claim 1, wherein determining the first qnode is at the head of the local queue comprises:
comparing a value in the first field of the predecessor qnode with an identification of the first cluster stored in the first qnode; and
identifying the value and the identification are not equal,
wherein the predecessor node represents a second thread executing on a second processor in a second cluster of the system, and
wherein the first field of the predecessor qnode comprises an identification of the second cluster.

8. The method of claim 1, wherein the first field of the predecessor qnode is a flag indicating the predecessor node is a tail qnode of the global queue.

9. The method of claim 1, wherein the second field of the predecessor qnode is a flag indicating the predecessor node has released the lock.

10. A system for managing queue-based locks, comprising:
a shared resource;
a first processor located in a first cluster of the system and configured to execute a first thread comprising a first critical section requiring a lock to access the shared resource;
a second processor located in a second cluster of the system and configured to execute a second thread comprising a second critical section requiring the lock to access the shared resource;
a first local queue located in the first cluster and configured to enqueue a first qnode representing the first thread, wherein the first qnode is a data structure referenced by a first pointer of the first thread;
a second local queue located in the second cluster and configured to enqueue a second qnode representing the second thread; and
a global queue corresponding to the shared resource and configured to enqueue the first qnode after the first local queue is spliced with the global queue and enqueue the second qnode after the second local queue is spliced with the global queue,
wherein the first thread obtains the lock and executes the first critical section after the first qnode is identified by the first thread as a head of the global queue, and wherein the second thread obtains the lock and executes the second critical section after the second qnode is identified by the second thread as the head of the global queue.

11. The system of claim 10, wherein the first qnode comprises:
   a first field identifying the first cluster;
   a second field configured to indicate the first qnode is a tail qnode of the global cluster; and
   a third field configured to indicate execution of the first critical section is complete and the lock is released.

12. The system of claim 10, further comprising:
   a predecessor qnode of the first qnode,
   wherein the first thread further comprises a second pointer referencing the predecessor qnode,
   wherein the local thread is spliced with the global thread in response to the first qnode being at a head of the first local queue, and
   wherein the first thread determines the first qnode is at the head of the first local queue based on a first value in the predecessor qnode.

13. The system of claim 12, wherein the first thread further determines the first qnode is at the head of the global thread based on a second value in the predecessor qnode.

14. A computer readable medium storing instructions for managing queue-based locks, the instructions when executed by a processor, comprising functionality to:
   identify, within a first cluster of a system, a first thread comprising a critical section requiring a lock to access a shared resource of the system;
   initialize a first qnode representing the first thread in response to the critical section requiring the lock, wherein the first qnode is a data structure referenced by a first pointer of the first thread;
   insert, in response to the critical section requiring the lock, the first qnode into a local queue of the first cluster by setting a tail pointer of the local queue to reference the first qnode, wherein the first thread comprises a second pointer referencing a predecessor qnode of the first qnode;
   determine, based on a first field in the predecessor qnode, the first qnode is at a head of the local queue;
   splice, in response to the first qnode being at the head of the local queue, the local queue into a global queue of the system for the shared resource,
   wherein splicing the local queue into the global queue comprises setting a tail pointer of the global queue to reference a tail qnode in the local queue;
   determine, based on a second field in the predecessor qnode, the first qnode is at a head of the global qnode;
   obtain, in response to the first qnode being at the head of the global queue, the lock on the shared resource for the first thread; and
   execute the critical section of the first thread after obtaining the lock.

15. The computer readable medium of claim 14, the instructions further comprising functionality to:
   set, after executing the critical section of the first thread, the first pointer of the first thread to reference the predecessor qnode.

16. The computer readable medium of claim 14, the instructions further comprising functionality to:
   insert a second qnode into the local queue after inserting the first qnode into the local queue,
   wherein the second qnode is a data structure representing a second thread,
   wherein the first qnode and the second qnode corresponds to a first-in-first-out (FIFO) order in the local queue, and
   wherein the FIFO order of the first qnode and the second qnode is preserved after splicing the local queue and the global queue.

17. The computer readable medium of claim 16, the instructions further comprising functionality to:
   release the lock following the execution of the critical section of the first thread by setting a field in the first qnode;
   determine, based on the field in the first qnode, the second qnode is at the head of the global qnode;
   obtain, in response to the second qnode being at the head of the global queue, the lock for the shared resource; and
   execute a critical section of the second thread after obtaining the lock.

18. The computer readable medium of claim 14, wherein the instructions comprising functionality to determine the first qnode is at the head of the local queue comprise functionality to:
   compare a value in the first field of the predecessor qnode with an identification of the first cluster stored in the first qnode; and
   identify the value and the identification are not equal,
   wherein the predecessor node represents a second thread executing on a second processor in a second cluster of the system, and
   wherein the first field of the predecessor qnode comprises an identification of the second cluster.

19. The computer readable medium of claim 14, wherein the first field of the predecessor qnode is a flag indicating the predecessor node is a tail qnode of the global queue.

* * * * *

UNITED STATES PATENT AND TRADEMARK OFFICE
CERTIFICATE OF CORRECTION

| | | |
|---|---|---|
| PATENT NO. | : 7,945,912 B1 | Page 1 of 1 |
| APPLICATION NO. | : 11/445962 | |
| DATED | : May 17, 2011 | |
| INVENTOR(S) | : Daniel S. Nussbaum et al. | |

It is certified that error appears in the above-identified patent and that said Letters Patent is hereby corrected as shown below:

In Claim 1, Column 7 (line 42), "qnode" should read as --field--.

In Claim 1, Column 7 (line 45), "field" should read as --qnode--.

In Claim 14, Column 9 (line 25), a "," should be added after "instructions".

Signed and Sealed this
Ninth Day of August, 2011

David J. Kappos
*Director of the United States Patent and Trademark Office*